US005496430A

United States Patent [19]

Suekane et al.

[11] Patent Number: 5,496,430
[45] Date of Patent: Mar. 5, 1996

[54] TAPING METHOD AND APPARATUS

[75] Inventors: Yoji Suekane; Kyoji Takeda, both of Tokyo, Japan

[73] Assignee: Tanaka Seiki Co., Ltd., Tokyo, Japan

[21] Appl. No.: 102,044

[22] Filed: Aug. 4, 1993

[30] Foreign Application Priority Data

Aug. 7, 1992 [JP] Japan .................................... 4-233025

[51] Int. Cl.$^6$ ...................................................... B32B 31/00

[52] U.S. Cl. .......................... 156/184; 156/191; 156/447; 156/522

[58] Field of Search .................................... 156/184, 185, 156/187, 188, 189, 191, 446, 447, 193, 522

[56] References Cited

U.S. PATENT DOCUMENTS 2,510,131 6/1950 Morin .................................. 156/576 X

*Primary Examiner*—James Engel
*Attorney, Agent, or Firm*—Spencer & Frank

[57] ABSTRACT

A taping method and apparatus for performing at least one taping operation. Each taping operation is performed by adhering an extra length of adhering allowance of a tape to an outer surface of a coil having a coil bobbin rotatably supported by a spindle. A tape retaining means is used to retain the tape against a tape rolling means while a foremost end of the tape is projected, by a distance corresponding to the extra length of adhering allowance, ahead of a retaining position defined by the tape retaining means. The distance between the spindle and the tape rolling means is shortened until they come into contact thereby causing the extra length of adhering allowance to adhere to the outer surface of the coil. Thereafter, the tape is wound about the coil by rotating the spindle, and a tape cutting means is displaced to cut the tape while the tape is retained between the tape retaining means and the coil bobbin and such that a subsequent extra length of adhering allowance of the tape does not enter a region defined by the tape retaining means. Any tape remaining on the coil is then wound by rotating the spindle. The coil bobbin is retractively displaced in an upward direction, and the tape is projected ahead of the retaining position of the tape retaining means by a distance corresponding to the extra length of adhering allowance. The above steps are repeated until all taping operations are completed.

20 Claims, 12 Drawing Sheets

TAPING METHOD AND APPARATUS

BACKGROUND OF THE INVENTION

The present invention relates generally to a taping method and a taping apparatus for covering a coil having a wire wound about a coil bobbin by a predetermined number of turns with a tape for exterior or interior sheathing. More particularly, the present invention relates to a taping method and a taping apparatus of the foregoing type which assure that each taping operation can be performed automatically and exactly at a predetermined position on the coil bobbin.

As is well known by any expert in the art, each coil winding operation has been hitherto automatically achieved by operating a coil winding machine. In this connection, a taping operation for covering a coil having a wire wound about a coil bobbin by a predetermined number of turns (hereinafter referred to simply as a coil) with a tape for exterior or interior sheathing has been likewise automatically performed with the aid of a taping apparatus adapted to cooperate with the coil winding machine. To cooperate with the taping apparatus, each winding machine is usually equipped with a plurality of tape unwinders which are incorporated in the winding machine.

To facilitate understanding of the present invention, a typical conventional taping apparatus will be described below with reference to FIG. 13 to FIG. 19.

FIG. 13 is a front view of the conventional taping apparatus which is adapted to cooperate with a coil winding machine wherein a base board 110 having a plurality of tape unwinders held thereon (hereinafter referred to simply as a base board) is attached to a three-dimensional displacing mechanism, i.e., a nozzle holder supporting unit 5 operable in three directions comprising a x-coordinate direction, a y-coordinate direction and a z-coordinate direction. FIG. 14 is a plan view of the coil winding machine to which the base board 110 is attached.

Referring to FIG. 14, a plurality of spindles 2 (four spindles in the shown case) are rotationally driven to rotate about a x-coordinate axis. The three-dimensional displacing mechanism, i.e., the nozzle holder supporting unit 5, is constructed such that a plurality of nozzle holders for holding a plurality of nozzles 3 and the base board 110 are arbitrarily displaced relative to the spindles 2 so as to feed a wire to be wound about a coil bobbin in the form of a coil as well as a tape to the coil winding machine and the taping apparatus.

As a tape is unwound from each of four tape supporting units 111 arranged on the base board 110 as shown in FIG. 13, it is fed through feed rollers 112*a*, 112*b*, and 112*c* (as shown in FIG. 15). The foremost end of each tape is then caused to adhere to the outer surface of a coil with the aid of a pad 113, and each coil bobbin 1 is fitted onto a spindle 2 as shown in FIG. 14. It should be noted that each taping operation is performed while the respective spindles 2 are rotated. On completion of the taping operation, the rearmost end of each tape is cut by actuating a cutter (not shown) adapted to be displaced adjacent to each pad 113 in the upward or downward direction.

The three-dimensional displacing mechanism, i.e., the nozzle holder supporting unit 5 is displaceably arranged in such a manner that while a coil winding operation is performed, the base board 110 of the taping apparatus is escapably parted away from the respective spindles 2 so as not to obstruct the coil winding operation, and subsequently, when a taping operation is to be performed, the base board 110 is displaced to come near to the spindles 2.

A mode of operation of the taping apparatus to be performed in cooperation with the coil winding machine including a plurality of tape unwinders will be described below with reference to FIG. 15 to FIG. 19. FIG. 15 to FIG. 19 are fragmentary illustrative views each of which shows the positional relationship among components constituting the taping apparatus as seen from the rear surface side of the base board 110 shown in FIG. 13. Particularly, each of FIG. 15 to FIG. 19 shows the positional relationship between a spindle 2 and the taping apparatus.

A coil bobbin 1 is fixedly mounted on the spindle 2. At this time, a coil wire has been already wound about the coil bobbin 1 by a predetermined number of turns to form a coil 7, and moreover, binding treatment has been already completed for immovably holding the rearmost end of the coil wire.

Referring to FIG. 15 which shows the operative state of the taping apparatus before a taping operation is started, the pad 113 is disposed on a perpendicular plane which intersects the center axis of the spindle 2 at a right angle, and a tape 6 is unwound from the corresponding tape unwinder until the rearmost end of the tape 6 reaches the position coincident with the pad 113. A tape retaining plate 117 serves to thrust the foremost end of the tape 6 against the pad 113 with the fore end part thereof from below.

Next, as shown in FIG. 16, the base board 110 is displaced in the downward direction, and at the same time, the tape retaining plate 117 is parted away from the pad 113 in the rightward direction as seen In the drawing. Subsequently, the pad 113 is lowered by actuating a pneumatic cylinder (not shown) so as to allow the tape 6 to adhere to the outer surface the coil 7 of which wire has been wound about the coil bobbin 1 by a predetermined number of turns. Incidentally, the foremost end of the tape 6 is thrusted against the pad 113 by the tape retaining plate 117 directly before the latter is parted away from the pad 113.

Next, as shown in FIG. 17, the pad 113 is escapably displaced in the upward direction, and the spindle 2 is rotated about the x-coordinate axis in the counterclockwise direction so that the tape 6 is wound about the coil 7. When the spindle 2 is rotated by a predetermined number of revolutions, the rotation of the spindle 2 is stopped.

Subsequently, as shown in FIG. 18, the base board 110 is displaced in the horizontal direction away from the coil bobbin 1 and it is then displaced in the downward direction by a predetermined distance.

At this time, the tape retaining plate 117 comes in contact with the pad 113 so that a part of the tape 6 is firmly clamped between the tape retaining plate 117 and the pad 113. While the foregoing state is maintained, a cutter 114 is displaced in the downward direction to reach the lowermost position represented by phantom lines in order to cut the tape 6 with a sharp edge thereof.

After the tape 6 is cut in that way, a rubber pad 121 arranged independently of the pad 113 is lowered toward the coil 7 until it comes in contact with a preceding layer of tape 6*a* wound about the coil 7, causing the tape 6 to be firmly thrusted against the coil 7 by the rubber pad 121, as shown in FIG. 19.

When the spindle 2 is rotated in the counterclockwise direction by several turns while the foregoing state is maintained, the tape 6*a* immovably adheres to the coil 7. It should be added that a rubber pad supporting plate 120 having the rubber pad 121 attached thereto is fixedly secured to the base board 110.

On completion of the taping operation, the base board 110 is displaced in the upward direction to restore the initial state as shown in FIG. 13.

Usually, after each taping operation is completed, a product of coil is detached from the spindle 2. However, in case that the foregoing taping operation is performed in the course of a coil winding operation merely for the purpose of tape insertion for interior sheathing, the coil winding operation is restarted on completion of the preceding taping operation.

With the conventional taping apparatus constructed in the above-described manner, however, it has been found that it has various problems that need to be solved as noted below.

For example, in case the foremost end of a tape fails to adhere to the coil for some reason, a taping operation is incorrectly achieved. In addition, the foremost end of the tape can occasionally adhere to the coil at a position which is offset from the desired position. In extreme case, no taping operation can be achieved with the taping apparatus.

Especially, if a wire winding part of the coil bobbin does not have a circular cross section but has a rectangular section as shown in FIG. 15 to FIG. 19, or in if the wound coil does not exhibit a smooth surface but has some ruggedness, it becomes practically difficult for the foremost end of the tape to correctly adhere to the coil.

In view of the foregoing difficulties, the tape retaining plate 117 is made of an elastic material so as to assure that the foremost end of a tape satisfactorily adheres to the coil regardless of the ruggedness on the coil surface. In addition, it has been found that similar problems arise with the rubber pad 121.

Next, the problems arising at the time of a tape cutting operation will be described below with reference to FIG. 18.

As is apparent from the drawing, the left-hand side of a tape 6 to be cut adheres to the coil bobbin 1, while the right-hand side of the same is firmly clamped between the pad 113 and the tape retaining plate 117. The pad 113 is made of a readily deformable elastic material. Thus, the tape 6 can not firmly be thrusted against the coil on the coil bobbin 1 side. For this reason, there arises an occasion that the cut end of the tape 6 exhibits a rugged shape or after the tape 6 is cut, it is dislocated from the predetermined position in the direction of the width thereof on the pad 113 side, i.e., in the x-coordinate direction.

In addition, the foremost end of the tape 6 can be disconnected from the coil 7 or dislocated from the predetermined position on the coil bobbin 1 for some reason when a taping operation is started while the tape 6 is thrusted against the coil 7 in that way during rotation of the coil bobbin 1 to adhere thereto with an adhesive power of the tape 6. Another problem is that the final state of the taping operation readily becomes unstable.

SUMMARY OF THE INVENTION

The present invention was conceived in order to overcome the above problems.

An object of the present invention is to provide a taping method which assures that each taping operation can reliably be achieved at a high efficiency by allowing part of a tape corresponding to an extra length of adhering allowance to adhere to the outer surface of a coil having a wire wound about a coil bobbin by a predetermined number of turns while the coil bobbin is rotatably supported by a spindle.

Another object of the present invention is to provide a taping method of the foregoing type which assures that each taping operation can correctly be achieved without any possibility that the tape is dislocated from a predetermined position on the coil bobbin or it is incorrectly deformed after it is cut by actuating a cutter.

A further object of the present invention is to provide a taping apparatus for practicing the taping method reliably.

According to one aspect of the present invention, there is provided a taping method wherein each taping operation is performed by allowing part of a tape corresponding to an extra length of adhering allowance located at the fore end part of the tape to adhere to the outer surface of a coil having a wire wound about a coil bobbin by a predetermined number of turns, the tape being fed to a taping apparatus in operative association with a coil winding machine from below relative to a spindle having the coil bobbin rotatably supported thereon, wherein the taping method comprises a waiting step in which the tape is thrusted against tape rolling means by tape retaining means while the foremost end of the tape is projected ahead of the position assumed by the tape retaining means by a distance corresponding to the extra length of adhering allowance; a tape adhering/winding step in which the spindle having the coil bobbin rotatably supported thereon is displaced toward the tape rolling means in the downward direction until it comes in contact with the tape rolling means, causing part of the tape corresponding to the extra length of adhering allowance to adhere to the outer surface of the toll on the coil bobbin in cooperation with the tape rolling means, and subsequently, the tape is wound about the coil on the coil bobbin by rotating the spindle; a tape cutting preparative step in which tape guiding means is displaced in the upward direction by actuating first driving means, and at the same time, the tape cutting means is displaced in the upward direction by actuating second driving means; a tape cutting step in which while the tape held on the tape guiding means is retained by the tape retaining means, the tape cutting means is displaced further in the upward direction by actuating the second driving means so that the tape is cut by the tape cutting means at the rearmost end thereof; a final tape winding step in which part of the tape remaining on the coil bobbin side is wound about the coil on the coil bobbin by rotating the spindle, and subsequently, the coil bobbin is retractively displaced in the upward direction; and a return step to a next waiting step in which part of the tape is projected again ahead of the same position assumed by the tape retaining means in the preceding waiting step by a distance corresponding to the extra length of adhering allowance before a next taping operation is started.

Usually, the tape retaining means is prepared in the form of a tape retainer which is turnably arranged outside of the tape guiding means to turn about a support shaft in the clockwise or counterclockwise direction as seen in the axial direction of the support shaft by actuating a tape retainer driving means.

The tape retainer is turned in the clockwise direction to come in contact with the tape on the coil so as to retain the tape therewith in the waiting step. When the tape retainer is turned in the counterclockwise direction, it is turnably parted away from the tape rolling means in the tape adhering or winding step, the tape cutting preparative step, the tape cutting step and the final tape winding step.

The tape rolling means is usually in the form of a pair of tape rollers which are located opposite to the coil bobbin rotatably supported by the spindle.

The tape guiding means is in the form of a plate-shaped tape guide which is arranged on the front surface side of a base board having a plurality of tape unwinders held thereon. The tape guide is located between the tape rollers and the tape retainer so that it is displaced therebetween in the upward or downward direction by actuating the tape guide driving means.

The tape cutting means is prepared in the form of a tape cutter which is arranged between the tape rollers and the tape guide and displaced therebetween in the upward and downward direction in cooperation with the tape guide by actuating the tape cutter driving means.

It is recommendable that the first driving means is designed in the form of a pneumatic cylinder which serves to displace the tape guide in the upward direction to reach the highest position in the tape cutting step and the final tape winding step.

Similarly, the tape cutter driving means is designed in the form of a pneumatic cylinder which serves to displace the tape cutter in the upward direction to reach the highest position in the tape cutting step.

In contrast with the tape guide and tape cutter driving means, it is recommendable that the tape cutter driving means is designed in the form of a pneumatic actuator which is arranged on the rear surface side of the base board to turn the tape retainer in the clockwise direction in the waiting step and then turn the tape retainer in the counterclockwise direction in the tape adhering/winding step, the tape cutting preparative step, the tape cutting step and the final tape winding step.

In addition, according to another aspect of the present invention, there is provided a taping apparatus wherein each taping operation is performed by allowing part of a tape corresponding to an extra length of adhering allowance located at the fore end part of the tape to adhere to the outer surface of a coil having a wire wound about a coil bobbin by a predetermined number of turns, the tape being fed to the taping apparatus from below relative to a spindle having the coil bobbin rotatably supported thereon, wherein the taping apparatus comprises tape feeding means for feeding the tape toward the coil on the coil bobbin in operative association with a coil winding machine; tape rolling means for holding the tape between the coil on the coil bobbin and the tape rolling means while part of the tape is projected ahead of the position assumed by the tape rolling means by a distance corresponding to the extra length of adhering allowance, the tape rolling means being relatively displaced between the position where it comes into contact with the outer surface of the coil on the coil bobbin while the tape is held between the tape rolling means and the coil on the coil bobbin and the position where it is parted away from the same; tape retaining means for retaining the tape in the clamped state in cooperation with the tape rolling means, the tape retaining means being turnably supported to turn about a support shaft in the clockwise and counterclockwise direction as seen in the axial direction of the support shaft between the clamped state attained by turning the tape retaining means in the clockwise direction and the unclamped state attained by turning the same in the counterclockwise direction; tape guiding means for guiding the feeding movement of the tape in cooperation with the tape rolling means, the tape guiding means being located between the tape rolling means and the tape retaining means and displacable in the upward and downward direction by actuating the tape guide driving means; tape cutting means for cutting the tape at the rearmost end of the latter by displacing the tape cutting means in the upward direction by actuating tape cutter driving means in operative association with the tape guide driving means while the tape is immovably held between the tape rolling means and the tape retaining means, the tape cutting means being located between the tape rolling means and the tape guiding means; spindle displacing means for displacing the spindle toward the tape rolling means, and moreover, displacing the spindle away from the tape rolling means; a base board on which the spindle, the tape feeding means, the tape rolling means, the tape retaining means, the tape guiding means, the tape cutting means and the spindle displacing means are directly and indirectly mounted in operative association with the coil winding machine; and controlling means for controllably driving the tape feeding means, the tape retaining means, the tape guiding means, the tape cutting means and the spindle displacing means in response to driving signals outputted from the controlling means.

It should be added that the taping apparatus further includes third driving means for turning the tape retaining means in the clockwise and counterclockwise direction.

Usually, the tape feeding means is in the form of a tape unwinder which is mounted on the base board in operative association with the coil winding machine.

It is recommendable that the tape rolling means be in the form of a pair of tape rollers which are located opposite to the roll bobbin rotatably supported by the spindle.

The tape retaining means is usually in the form of a tape retainer or a tape retaining plate which is turnably arranged outside of the tape guiding means to turn about a support shaft in the clockwise and counterclockwise direction as seen in the axial direction of the support shaft by actuating the tape retainer driving means.

When the tape retainer is turned in the clockwise direction until it comes in contact with the tape on the coil, the tape is retained by the tape retainer. Subsequently, when the tape retainer is turned in the counterclockwise direction, it is turnably parted away from the tape and the tape rollers.

Usually, the tape guiding means is prepared in the form of a plate-shaped tape guide which is arranged on the front surface side of the base board. The tape guide is located between the tape rollers and the tape retainer so that it is displacable therebetween in the upward and downward direction by actuating the tape guide driving means.

The tape cutting means is prepared in the form of a blade-shaped tape cutter which is arranged between the tape rollers and the tape guide. In operation, the tape cutter is displaced between the tape rollers and the tape guide in the upward and downward direction in cooperation with the tape guide by actuating the tape cutter driving means.

The tape feeding means is usually prepared in the form of a tape unwinder which is arranged on the base board to feed a tape from the tape unwinder.

It is recommendable that the tape guide driving means be in the form of a pneumatic cylinder which serves to displace the tape guide in the upward direction to reach the highest position where the tape is cut by the tape cutter at the rearmost end thereof.

Similarly, the tape cutter driving means is prepared in the form of a pneumatic cylinder which serves to displace the tape cutter in the upward direction in operative association with the tape guide to reach the highest position where the tape is cut by the tape cutter at the rearmost end thereof.

In contrast with the tape guide driving means and the tape cutter driving means, the tape retainer driving means is prepared in the form of a pneumatic actuator which is arranged on the rear surface side of the base board to turn the tape retainer about the support shaft in the clockwise and counterclockwise direction.

The controlling means is usually prepared in the form of a microprocessor which generates driving signals for controllably driving the tape unwinder, the tape retainer, the tape guide, the tape cutter and the spindle displacing means in response to the driving signals outputted therefrom.

Other objects, features and advantages of the present invention will become apparent from reading of the following description which has been made in conjunction of the accompanying drawings.

BRIEF DESCRIPTION OF THE DRAWINGS

The present invention is illustrated in the following drawings in which.

DESCRIPTION OF THE PREFERRED EMBODIMENTS

Figure 1:
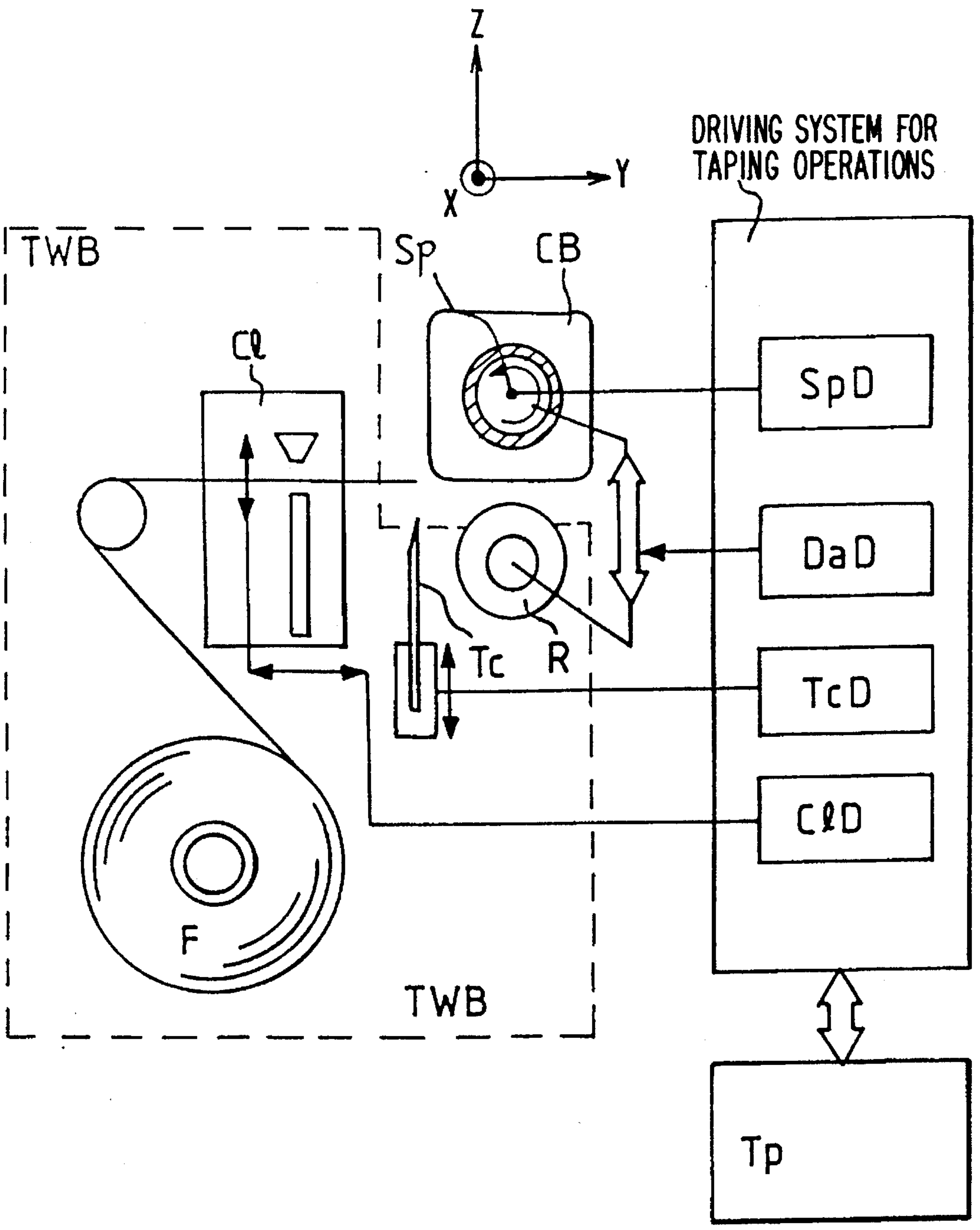
FIG. 1 is a block diagram which schematically shows the structure of a taping apparatus constructed according to a preferred embodiment of the present invention.

The present invention will now be described in detail hereinafter with reference to the accompanying drawings which illustrate a preferred embodiment thereof.

First, a basic structure and a mode of operation of a taping apparatus constructed according to the embodiment of the present invention will be described below with reference to FIG. 1 and FIG. 2.

A spindle Sp is rotated while holding a coil bobbin CB thereabout. As a tape is fed from a tape feeding unit F, it is wound about the coil bobbin CB which is rotated by the spindle Sp.

A tape retaining roller R is displaced toward the spindle Sp until it comes in contact with the outer surface of the coil bobbin CB with the tape retained therebetween, whereby it is rotated by the spindle Sp via the coil bobbin CB, thereby defining a rotating position.

The distance between the tape axes of retaining roller R and spindle Sp, hereinafter referred to as the center distance can adequately be adjusted such that the tape retaining roller R can assume either its rotating position, or a position where it is parted away from the coil bobbin CB, hereinafter referred to as a parting position.

A tape clamping unit C1 serves either to hold the tape in the clamped state at an arbitrary position in the vicinity of the foremost end of the tape, or to release the tape from the clamped state. Thus, the position assumed by the foremost end of the tape held in the clamped state can arbitrarily be adjusted with the aid of the tape clamping unit C1.

A tape cutting unit Tc serves to cut the tape at a certain position between the position it is held in the clamped state by actuating the tape clamping unit C1 and the position where it is retained between the tape retaining roller R and the coil bobbin CB.

The tape feeding unit F, the tape retaining roller R, the tape clamping unit C1 and the tape cutting unit Tc are arranged on a base board TWB having a plurality of tape unwinders held thereon (hereinafter referred to simply as a base board), and the base board TWB is drivably displaced by a driving unit DaD adapted to displace the tape retaining roller R so as to adequately adjust the center distance between the spindle Sp and the tape retaining roller R.

A taping operation controlling unit Tp is prepared in the form of a microprocessor which generates driving signals for a spindle driving unit SpD for rotationally driving the spindle Sp, the driving unit DaD for displacing the tape retaining roller R, a driving unit C1D for driving the tape clamping unit C1 and a driving unit TcD for driving the tape cutting unit Tc.

Next, a series of steps for operating the taping apparatus constructed in the aforementioned manner will be described below with reference FIG. 2.

Waiting step

In this step, the adhering surface of the tape at the foremost end of the latter is located between the coil bobbin CB rotatably supported by the spindle Sp and the tape retaining roller R while the tape retaining roller R is brought in contact with the tape on the coil bobbin CB in cooperation with the tape clamping unit C1.

Tape adhering/winding step

In this step, the foremost end of the tape adheres to the outer surface of a coil having a wire wound about the coil bobbin CB by a predetermined number of turns (hereinafter referred to simply as a coil) as the tape is wound about the coil on the coil bobbin CB by rotating the tape retaining roller R and the spindle Sp.

Tape cutting step

In this step, while the tape is firmly held in the clamped state with the aid of the tape clamping unit C1, it is cut by actuating the tape cutting unit Tc while part of the tape corresponding to an extra length of adhering allowance (corresponding to an extra length of tape) is left uncut.

Final tape winding step

In this step, after completion of the tape cutting operation, part of the tape remaining on the coil bobbin side is wound about the coil. On completion of the final taping operation, the coil bobbin CB, i.e., a product of coil is detached from the spindle Sp so that it is replaced with a next coil bobbin CB.

Return step to a next waiting step

In this step, the foremost end of the tape is projected again to extend above the tape retaining roller R to reach the same position as that assumed in the foregoing waiting step. The above is accomplished while taking into account the positional relationship between the forward end of the tape and the next coil bobbin CB, so that subsequently, the forward part of the tape can be held in the clamped state by actuating the tape clamping unit C1.

It should be noted that for a period of time from the tape adhering/winding step till the final tape winding step, the tape retaining roller R continuously serves to thrust the tape against the coil on the coil bobbin CB.

The tape feeding unit F, the tape retaining roller R, the tape clamping unit C1 and the tape cutting unit Tc are arranged on the base board TWB, and the base board TWB is drivably displaced by actuating the driving unit DaD which serves to adequately adjust the center distance between the spindle Sp and the tape retaining roller R.

FIG. 3, FIG. 4, FIG. 5 and FIG. 6 are perspective views each of which shows the tape clamping unit C1, the tape retaining roller R and the tape cutting unit Tc each serving as an essential component for the taping apparatus constructed according to the embodiment of the present invention.

In detail, the tape clamping unit C1 is composed of a tape retainer 80 turnably disposed on the base board TWB and a tape guide 40 slidably disposed on the base board TWB to slidably move relative to the tape retainer 80. The driving unit C1D for driving the tape clamping unit C1 is prepared in the form of an actuator which serves to actuate each of the tape retainer 80 and the tape guide 40.

The tape cutting unit Tc is likewise prepared in the form of an actuator which serves to actuate a tape cutter 60.

Figure 2:
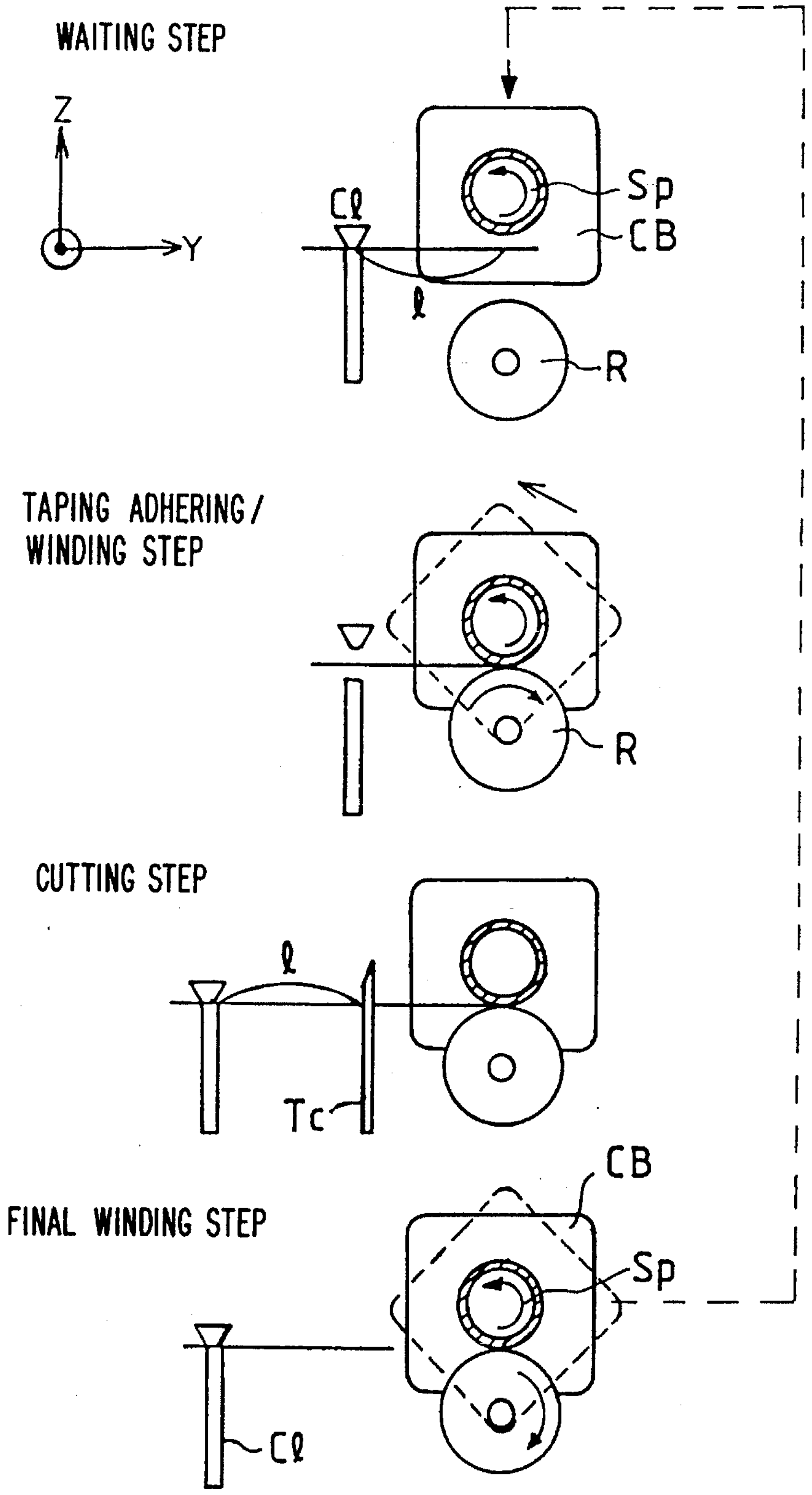
FIG. 2 is an illustrative view which schematically shows a series of steps for performing a taping operation with the taping apparatus shown in FIG. 1.
Figure 4:
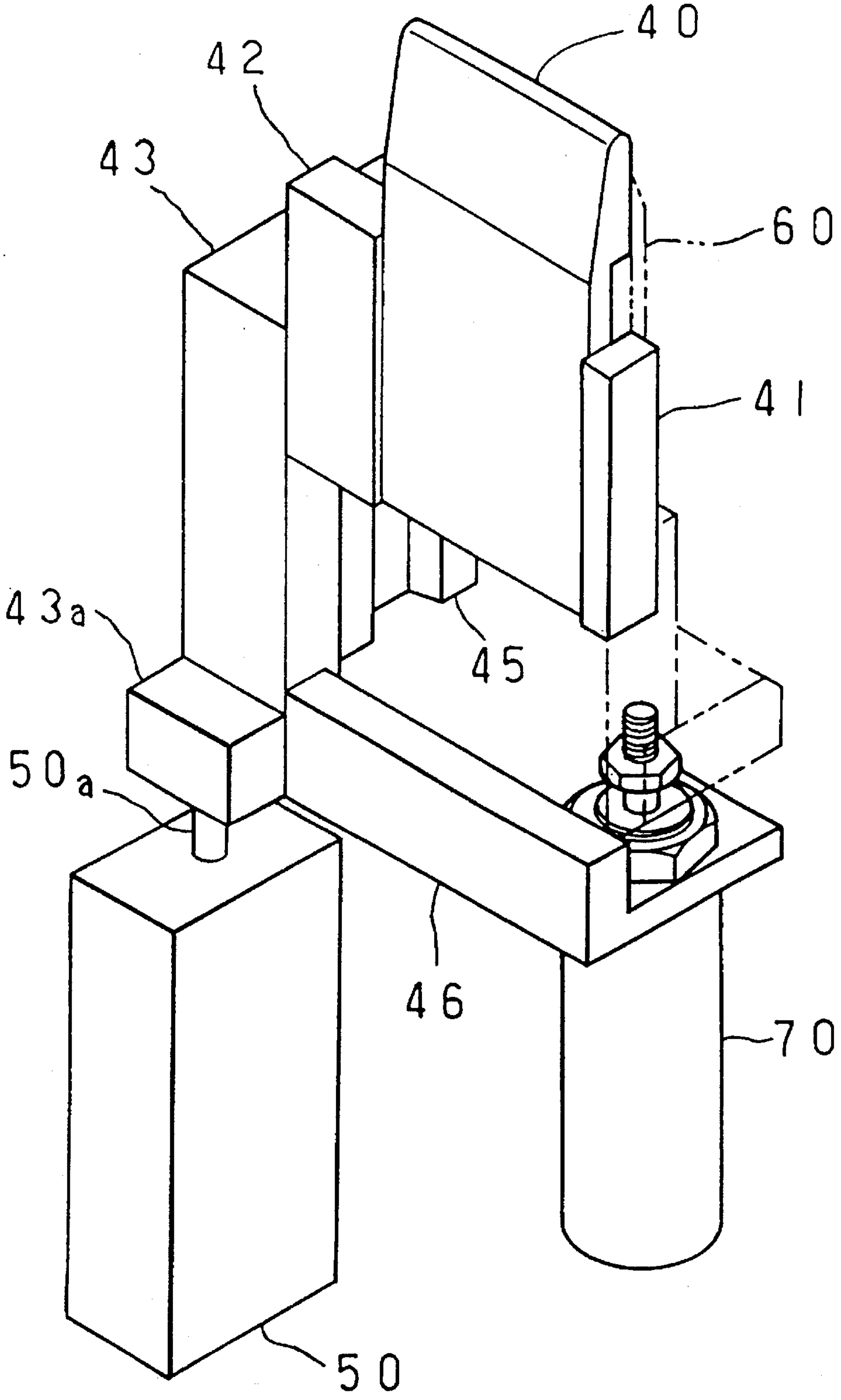
FIG. 4 is a fragmentary perspective view of the taping apparatus, particularly showing a tape guide and associated components each of which is operatively associated with the taping apparatus shown in FIG. 3.

FIG. 4 is a perspective view which shows the tape guide 40, a supporting mechanism for supporting the tape guide 40, and other components associated with the tape guide 40 and the supporting mechanism, each of which constitutes part of the tape clamping unit C1 for the taping apparatus as illustrated in FIG. 2.

Figure 3:
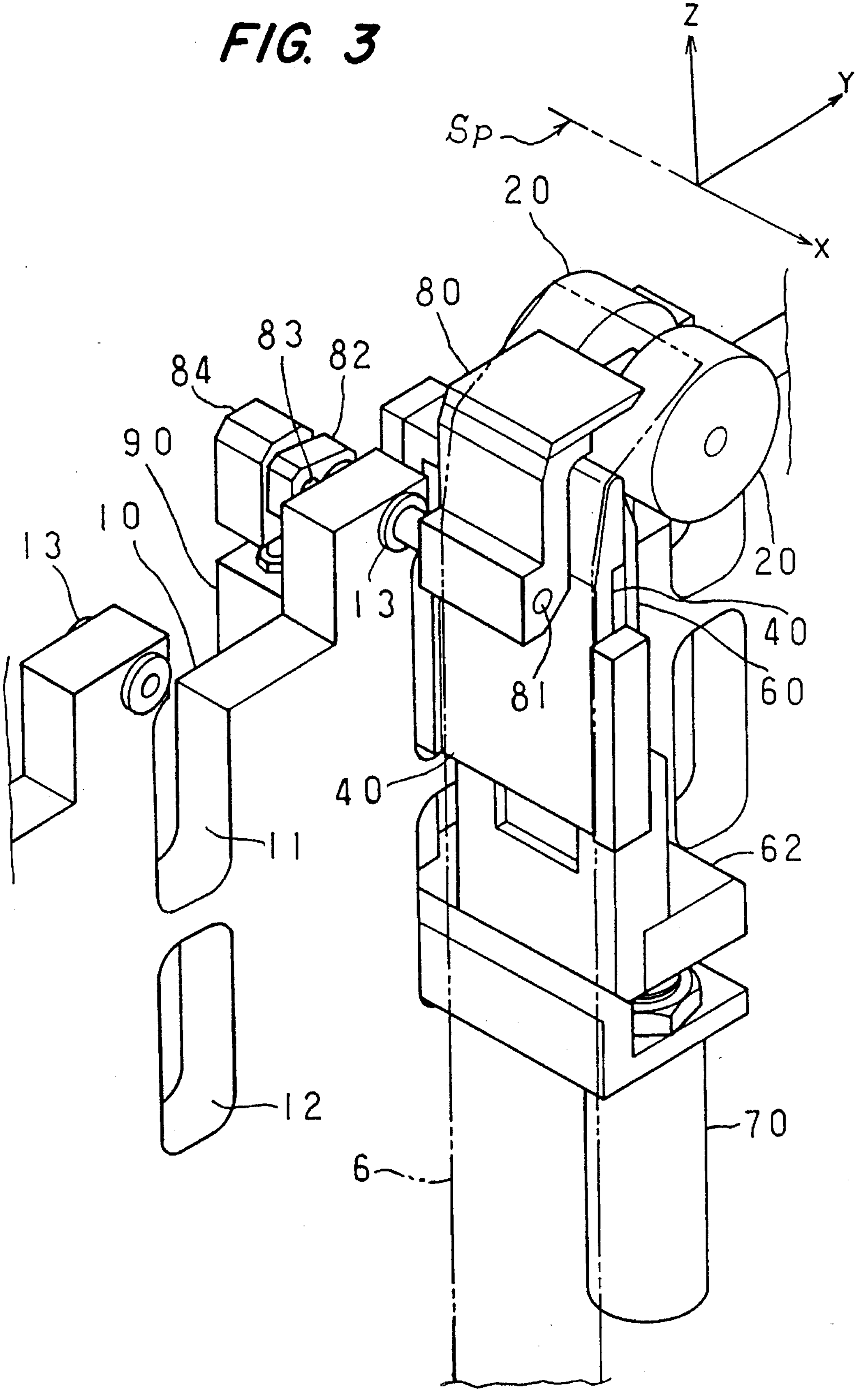
FIG. 3 is a perspective view of the taping apparatus shown in FIG. 1 and FIG. 2, particularly showing essential components constituting the taping apparatus.
Figure 5:
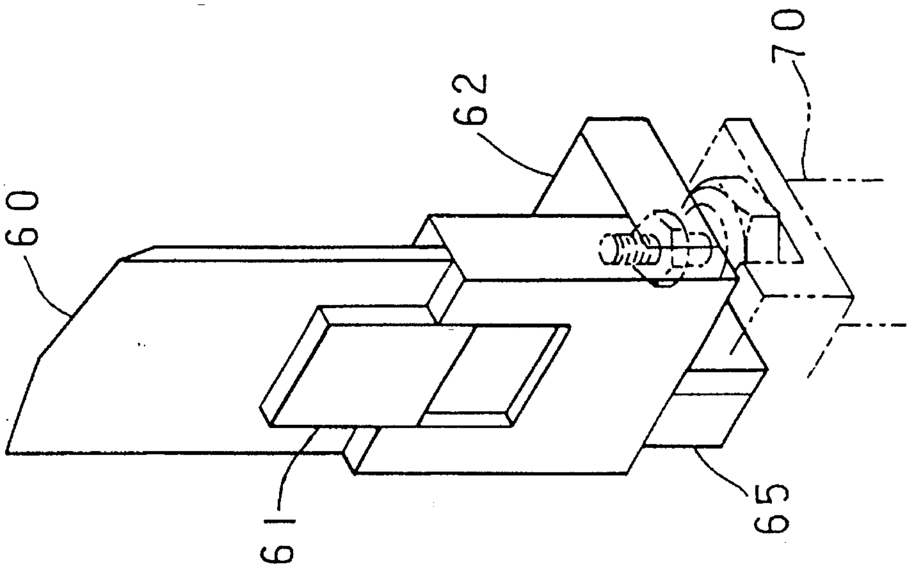
FIG. 5 is a perspective view of a cutter and associated components each of which is operatively associated with the taping apparatus shown in FIG. 3.

FIG. 5 is a perspective view which shows the tape cutter 60 and a supporting mechanism for supporting the tape cutter 60 for the taping apparatus as illustrated in FIG. 3.

Figure 6:
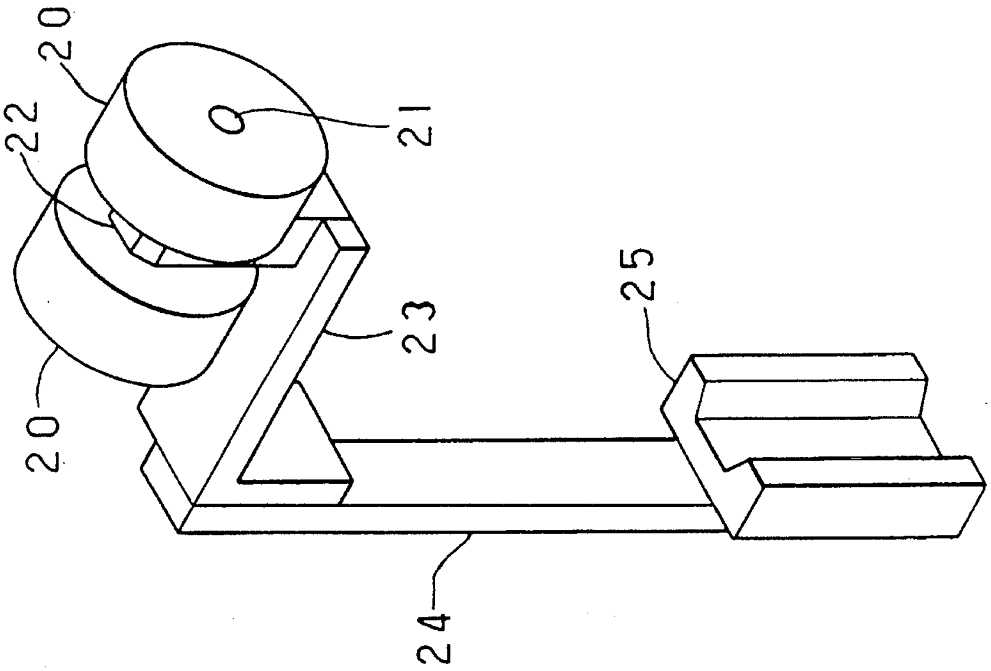
FIG. 6 is a perspective view of a pair of tape rollers and associated components each of which is operatively associated with the taping apparatus shown in FIG. 3.

FIG. 6 is a perspective view which shows a pair of tape rollers 20 and a supporting mechanism for rotatably supporting the tape rollers 20 for the taping apparatus as illustrated in FIG. 3.

It should be noted that FIG. 3 to FIG. 6 show merely essential components constituting the taping apparatus, and illustration of components other than the foregoing essential components is neglected for the purpose of simplification. In addition, illustration of a coil bobbin, a wire to be wound about the coil bobbin and a tape to be wound about a coil are also neglected for the same purpose, it should be added that the position assumed by the tape (corresponding to the positional state shown in FIG. 7) is represented by phantom lines in FIG. 3.

Referring back to FIG. 3, the position of a center axis of the spindle Sp is represented by a phantom line. As described above, the conventional taping apparatus shown in FIG. 13 to FIG. 19 is constructed In such a manner that the tape is fed from above relative to the spindle Sp. In contrast with the conventional taping apparatus, the taping apparatus of the present invention is constructed in such a manner that the tape is fed from below relative to the spindle Sp.

The taping apparatus constructed according to the embodiment of the present invention includes as essential components the tape guide 40 and the tape retainer 80 each constituting the tape clamping unit C1, and moreover, the tape rollers 20 and the tape cutter 60 serving as tape cutting means.

Figure 3A:
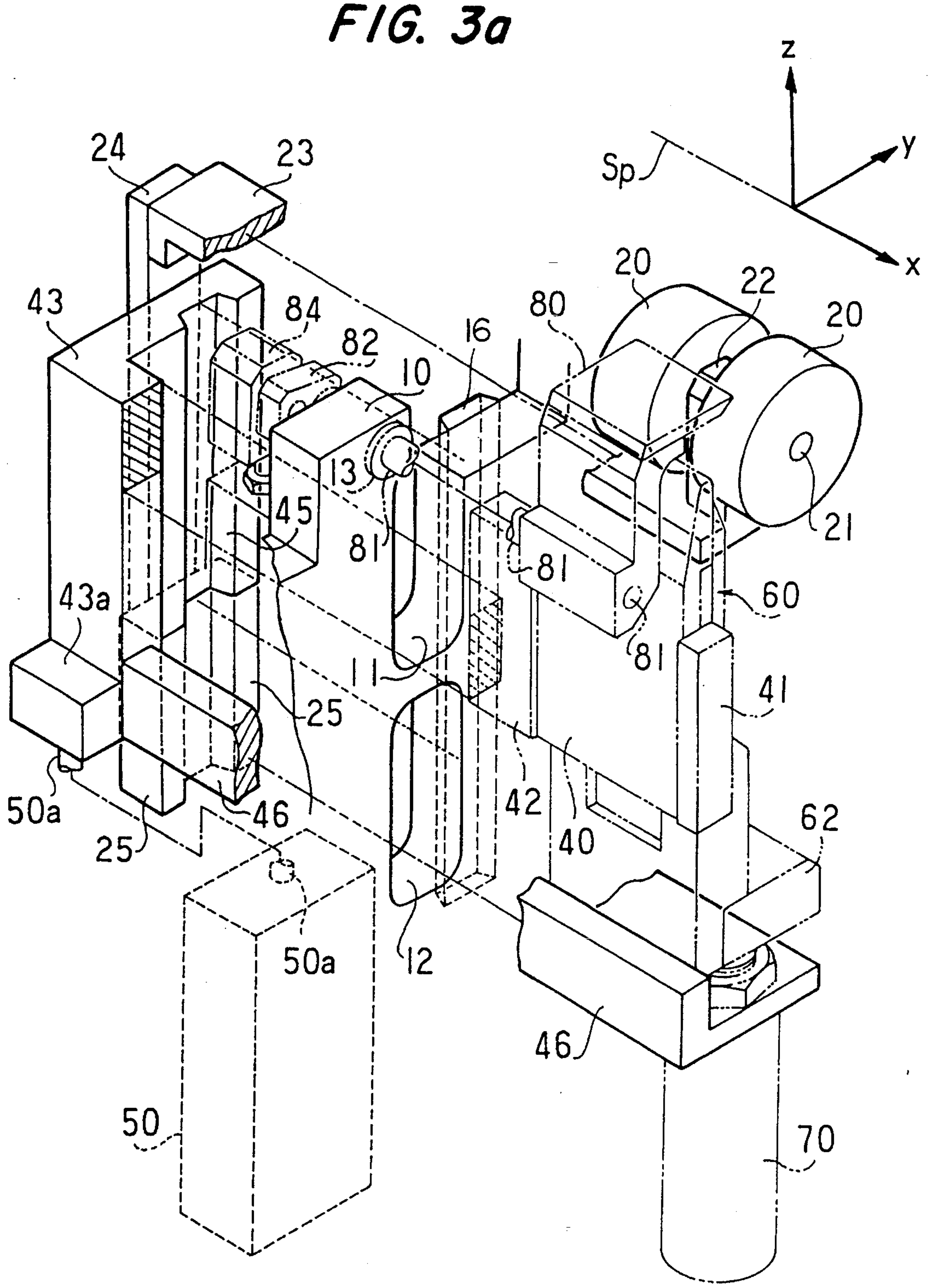
FIG. 3*a* is an expanded perspective view of the taping apparatus of FIG. 3.

The base board designated by reference numeral 10 in FIGS. 3 and 3*a* is a base board on which the aforementioned components are directly or indirectly supported. In practice, the base board 10 corresponds to the base board 110 for the conventional taping apparatus shown in FIG. 13.

With the taping apparatus constructed according to the embodiment of the present invention, the base board 10 is arranged below a plurality of nozzles each serving to conduct a wire to a predetermined position on the coil bobbin CB during each coil winding operation (i.e., below a plurality of spindles each serving to rotate a coil bobbin while holding the same).

Figure 13:
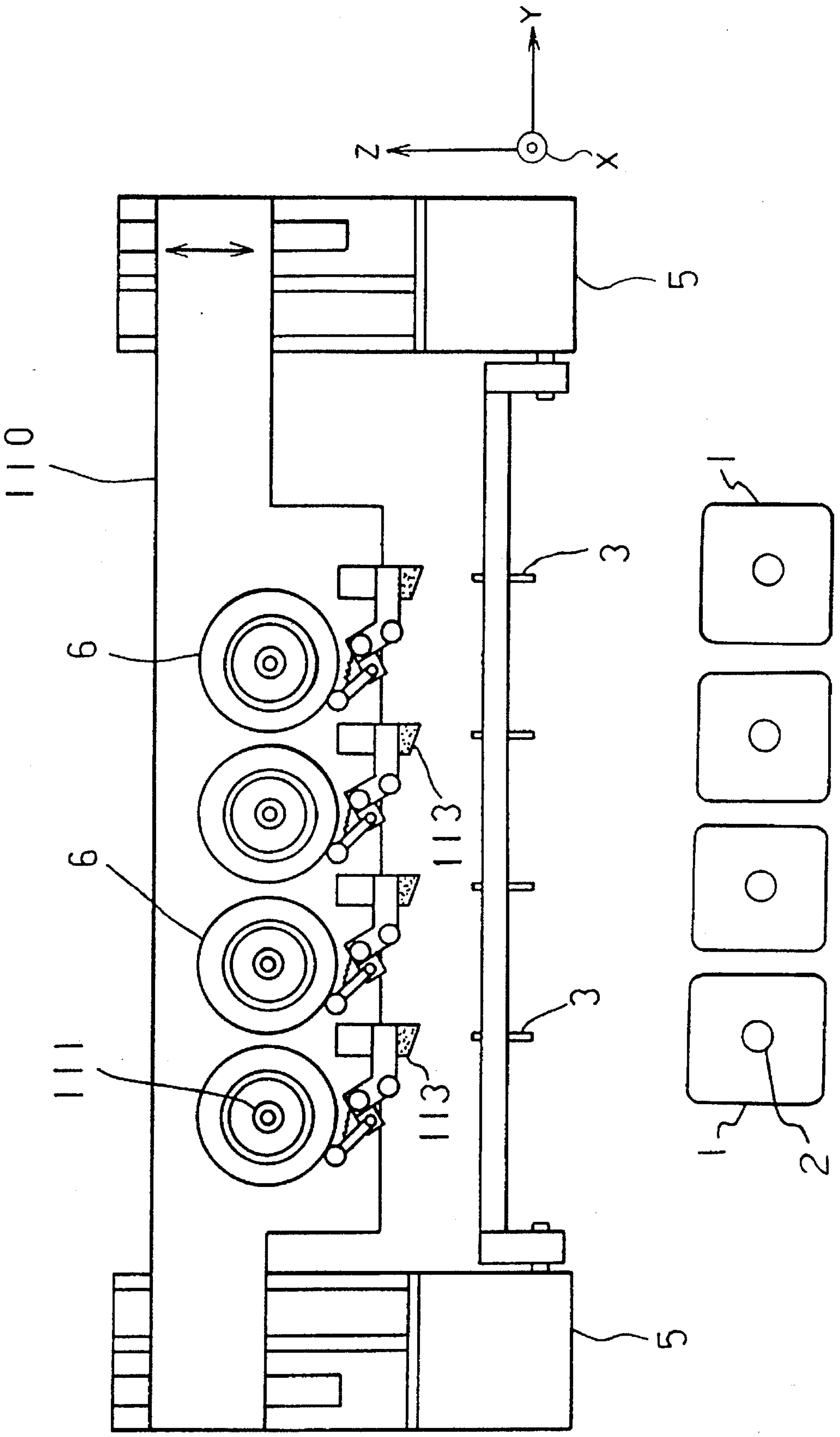
FIG. 13 is a front view which shows by way of example the structure of a conventional taping apparatus employable for a coil winding machine.
Figure 14:
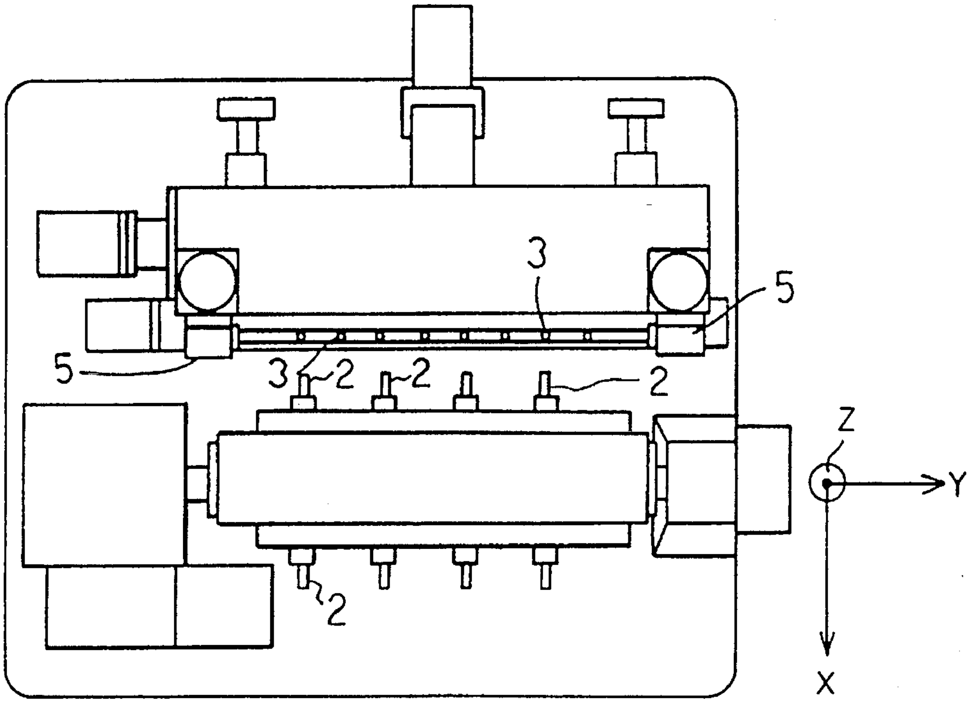
FIG. 14 is a plan view which shows the conventional taping apparatus and the coil winding machine before the conventional taping apparatus shown in FIG. 13 is installed to cooperate with the coil winding machine.
Figure 15:
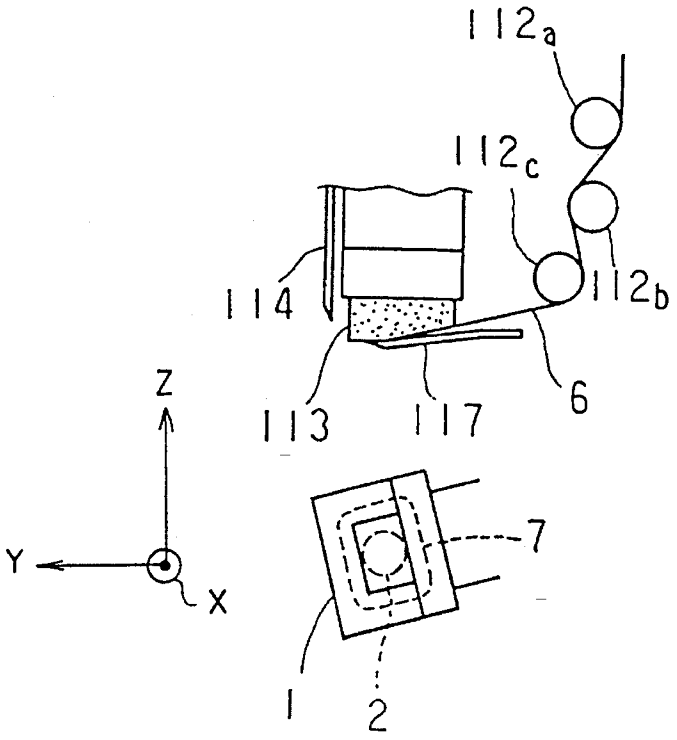
FIG. 15 to FIG. 19 are illustrative views each of which shows a mode of operation of the conventional taping apparatus shown in FIG. 13.
Figure 16:
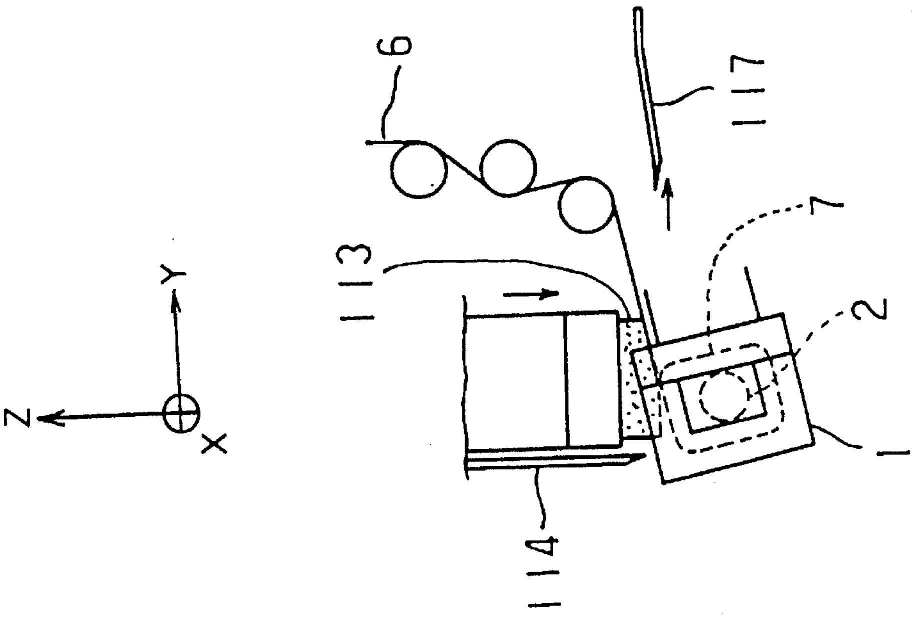
Figure 17:
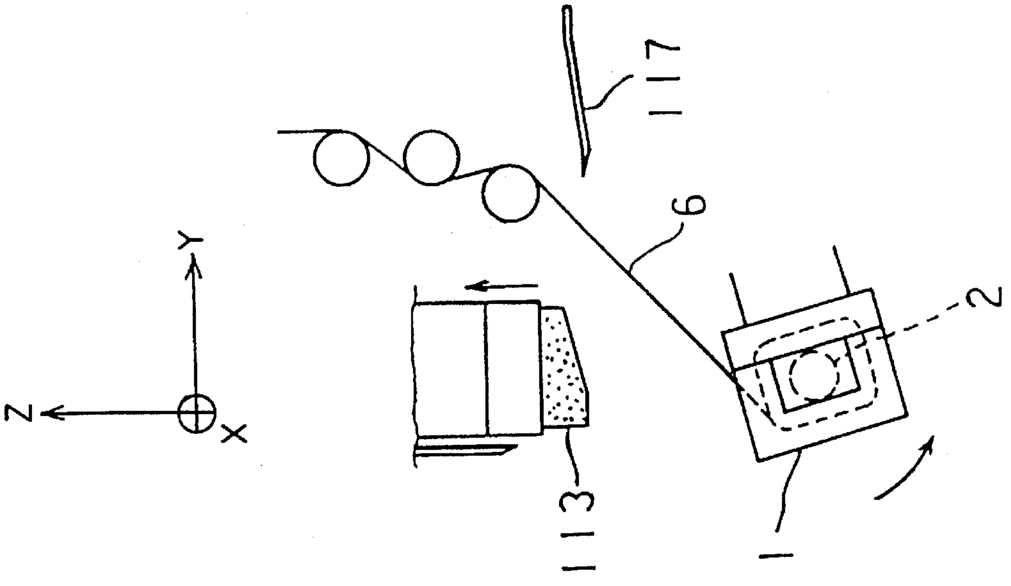
Figure 18:
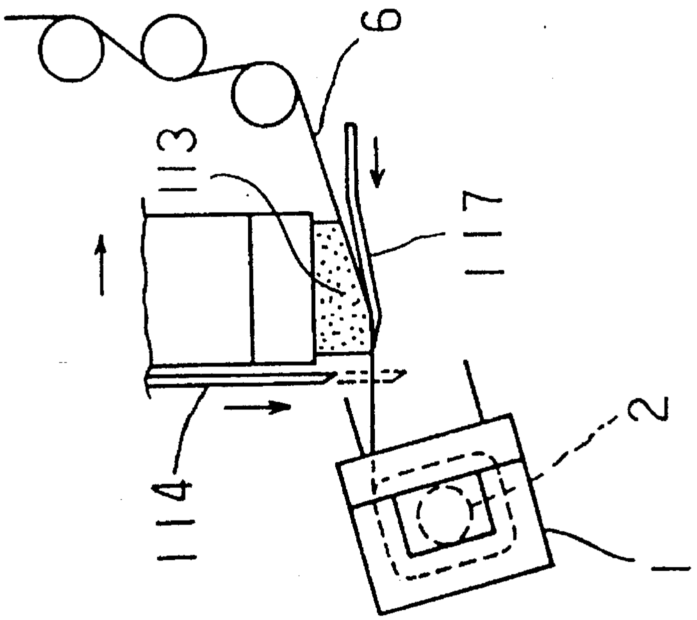
Figure 19:
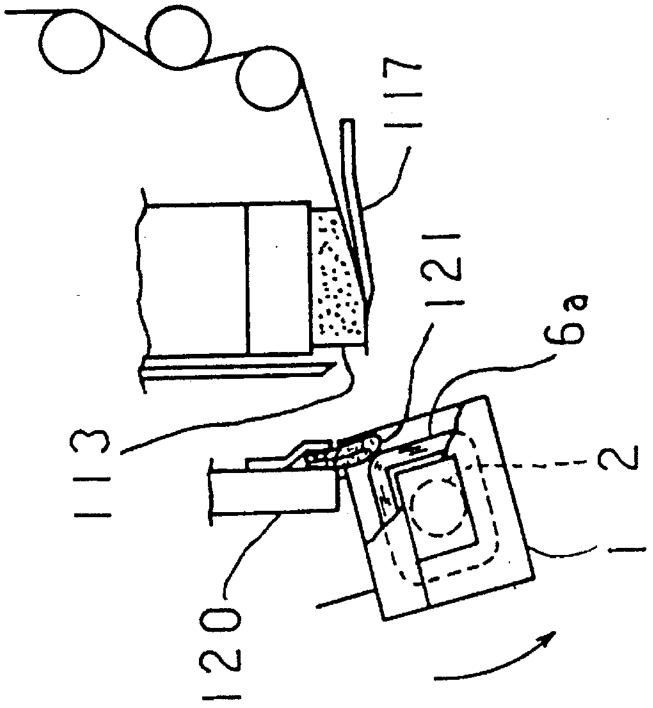

In addition, the aforementioned tape feeding unit F for the taping apparatus may be arranged upside down in such a manner that a tape is fed from above relative to the spindle Sp like the conventional taping apparatus shown in FIG. 13.

A tape 6 is first unwound from the tape feeding unit F as shown in FIG. 1, it is then raised up along the tape guide 40 as represented by phantom lines in FIG. 3, and subsequently, it is conducted to the tape rollers 20 after it passes between the tape retainer 80 and the tape guide 40.

As shown in FIGS. 3*a* and 4, the tape guide 40 forming part of the tape clamping unit C1 is supported in the clamped state between a pair of guide blocks 41 and 42, and the guide block 42 is supported by a tape guide driving block 43. In addition, a pneumatic cylinder 50 for driving the tape guide 40 in the upward or downward direction is fixedly mounted on the rear surface side of the base board 10 as shown in FIG. 3. A movable part 50*a* of the pneumatic cylinder 50 is fixedly secured to the bottom of the tape guide driving block 43.

With this construction, as the pneumatic cylinder 50 is driven in the upward or downward direction, the tape guide 40 is displaced in the upward or downward direction relative to the base board 10. In FIGS. 3*a* and 4, reference numeral 45 designates a movable part of a linear guide (not shown) adapted to be slidably engaged with a linear guide rail 16 fixedly secured to the rear surface of the base board 10.

As shown in FIG. 4, an arm 46 is fixedly secured to the tape guide driving block 43 so as to allow a pneumatic cylinder 70 to be fixed to the arm 46 in order to drive the tape cutter 60. In addition, as shown In FIG. 5, a movable part of the pneumatic cylinder 70 is fixedly secured to a cutter driving block 62 which serves to support a cutter holding portion 61.

A movable part 65 of the linear guide is fixedly secured to the cutter driving block 62 which in turn is slidably engaged with another linear guide rail (not shown) which is fixedly secured to the base board 10 on the front surface side of the latter. Thus, as the pneumatic cylinder 70 is driven in the upward or downward direction, the tape cutter 60 is displaced along the tape guide 40 in the upward or downward direction relative to the latter. To assure that the displacement of the guide block 42 and the arm 46 in the upward or downward direction is not obstructed at all, a window-shaped cutout 11 and an elongated hole 12 are formed through the base board 10 (see FIG. 3).

As shown in FIG. 6, the tape rollers 20 are rotatably supported on a roller supporting block 22 to rotate about a support shaft 21. The roller supporting block 22 is fixedly secured to an arm 23 which will turn is fixedly secured to a roller supporting bar 24. A movable part 25 of the linear guide is fixed to the roller supporting bar 24. Thus, the movable part 25 of the linear guide can be displaced in the upward or downward direction while it is engaged with the linear guide rail (not shown) arranged on the rear surface side of the base board 10 to serve also as a linear guide rail adapted to be engaged with the movable part 45 of the linear guide. In addition, the movable part 25 of the linear guide is normally biased in the upward direction by the resilient force of a coil spring (not shown). Since the movable part 45 of the linear guide is arranged above the movable part 25 of the same, movable part 25 can not be raised up in excess of a predetermined height restrictively defined by the position of the tape guide 40.

As shown in FIG. 3, the tape retainer 80 is turnably supported to turn about a support shaft 81 which extends through a bush 13 fitted into the base board 10. A turnable block 82 is fixed to the support shaft 81 on which the tape retainer 80 is turnably supported. The turnable block 82 is engaged with a tape retainer driving block 84 on the opposite side to the support shaft 81 via pins 83 in such a manner as to adjustably change an engagement angle thereof relative to the tape retainer driving block 84. A movable part of a pneumatic actuator 90 Is fixed to the tape retainer driving block 84 in order to turnably drive the tape retainer 80 in the clockwise or counterclockwise direction. The pneumatic actuator 90 is fixedly secured to the base board 10 on the rear surface side of the latter. Thus, as the pneumatic actuator 90 is actuated, the tape retainer 80 can be turned at a certain angle relative to the base board 10.

It should be noted that several kinds of tape rollers 20, tape guides 40, tape cutters 60 and tape retainers 80 are prepared corresponding to the number of tapes each having a different width to be practically used for taping operations so as to enable the present combination of the tape rollers 20, the tape guide 40, the tape cutter 40 and the tape retainer 80 to be exchanged with another one.

Next, a mode of operation of the taping apparatus constructed in the aforementioned manner will be described below with reference to FIG. 7 to FIG. 12.

Waiting step

Figure 7:
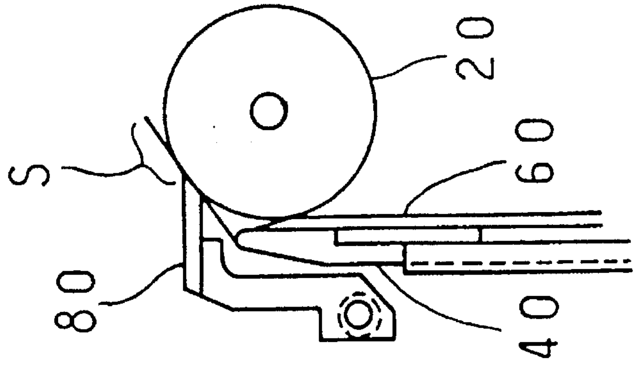
FIG. 7 to FIG. 12 are illustrative views each of which shows a mode of operation of the taping apparatus shown in FIG. 1 and FIG. 2.

In this step as shown in FIG. 7, a tape 6 is retained by the tape retainer 80 while the foremost end of the tape 6 is projected ahead of the position of the tape retainer 80 by a distance corresponding to an extra length of adhering allowance S or 5 to 10 mm (corresponding to the state represented by phantom lines in FIG. 3). This step corresponds to the waiting state before a taping operation is stared.

Tape adhering/winding step

Figure 8:
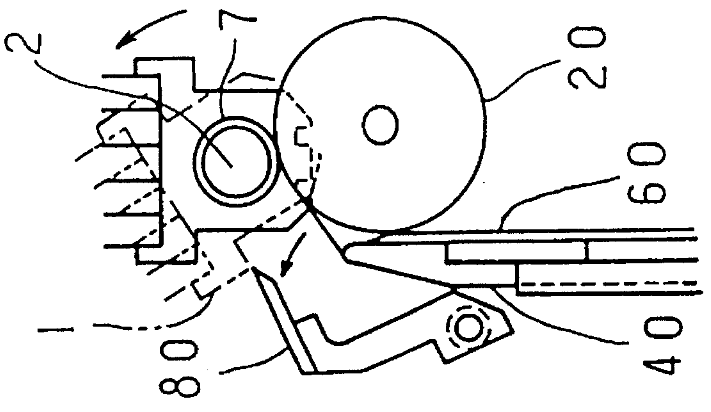

In this step as shown in FIG. 8, a spindle 2 having a coil bobbin 1 rotatably supported thereon is displaced toward the tape rollers 20 in the downward direction until it slantwise comes in contact with the tape rollers 20, causing the extra length of adhering allowance S of the tape 6 to adhere to the outer surface of a coil 7 having a wire wound about the coil bobbin 1 by a predetermined number of turns (hereinafter referred to simply as a coil). In this embodiment, the foregoing slantwise displacement of the spindle 2 in the downward direction is achieved by displacing the base board 10. Alternatively, it may be achieved by displacing the spindle 2 side. At this time, the tape retainer 80 is turned In the anticlockwise direction as seen in FIG. 8 so that the foremost end of the tape retainer 80 is separated away from the tape 6. Alternatively, the foregoing separation of the tape retainer 80 away from the tape 6 may be achieved by largely thrusting the coil bobbin 1 against the tape rollers 20 to depress the tape rollers 20 with the coil bobbin 1, causing the tape 6 to adhere to the outer surface of the coil 7, as represented by phantom lines in FIG. 12.

While the foregoing state is maintained, the tape 6 is wound about the coil 7 by rotating the spindle 2.

Tape cutting preparative step

Figure 9:
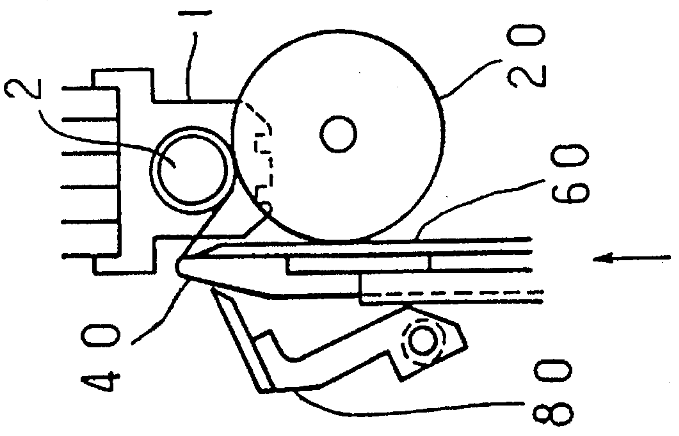

In this step as shown in FIG. 9, to assure that an extra length of adhering allowance S is reserved at the forward end part of the tape 6 during the waiting state for performing a taping operation with the tape 6, the tape guide 40 is displaced in the upward direction by actuating the pneumatic cylinder 50, and at the same time, the tape cutter 60 is also displaced In the upward direction by actuating the pneumatic cylinder 50 adapted to drive the tape guide 40.

Cutting step

Figure 10:
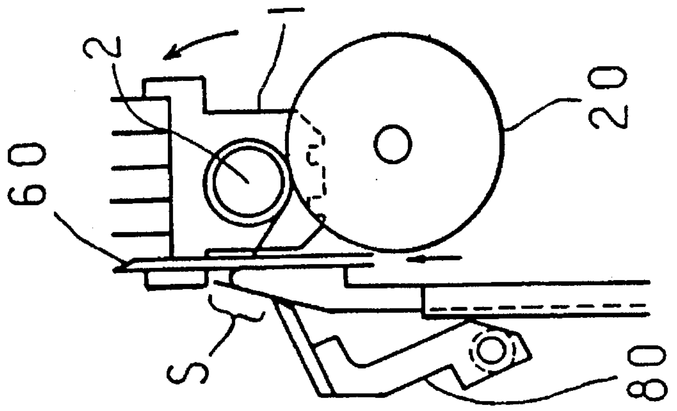

In this step as shown in FIG. 10, after the tape 6 held on the tape guide 40 is retained by the tape retainer 80 in the clamped state, the tape cutter 60 is displaced further in the upward direction by actuating the pneumatic cylinder 70 so that the tape 6 is cut by the tape cutter 60. On completion of the cutting operation, the cutter 60 is immediately displaced in the downward direction to return to the original position. Incidentally, since the tape 6 is firmly held on the coil 7 during the cutting operation by forcibly thrusting the tape 6 against the coil 7 on the coil bobbin 1 with the tape rollers 20, there does not arise a malfunction that the tape 6 is dislocated away from the predetermined position on the cell 7. In addition, since the cutting operation is performed In such a state that the tape 6 is thrusted against the undeformable hard tape guide 40 with a sufficiently large width thereof, the tape 6 is exactly cut at the correct position as preliminarily designed.

Final tape winding step

Figure 11:
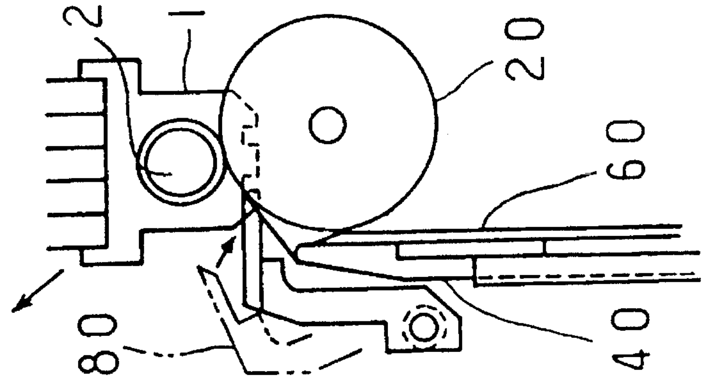

In this step as shown in FIG. 11, part of the tape remaining on the cell bobbin 1 side is wound about the coil 7 by rotating the spindle 2.

Figure 12:
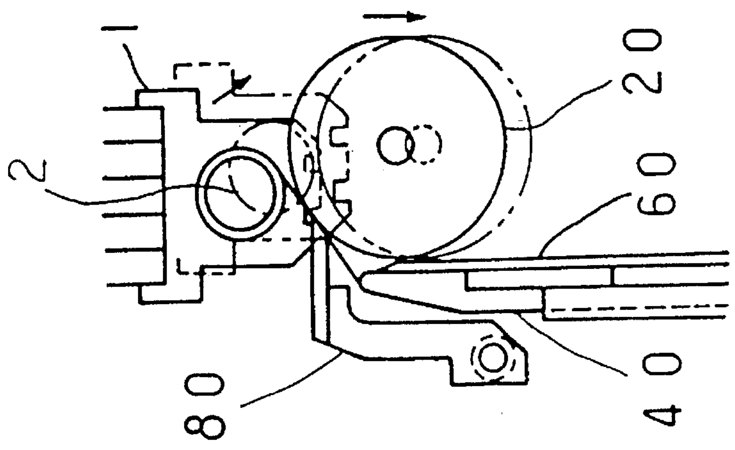

Subsequently, the coil bobbin 1 is retracted slantwise in the upward direction as shown in FIG. 12. In the shown embodiment, the base board 10 is slantwise displaced in the downward direction so that the coil bobbin 1 is relatively parted away from the tape rollers 20.

Thereafter, as shown In FIG. 11, the tape guide 40 is retracted in the downward direction and the tape retainer 80 is then turned in the clockwise direction so as to allow the tape 6 to be thrusted against the tape rollers 20 to hold the tape 6 on the tape rollers 20 with the tape retainer 80. At this time, since the surface of the tape 6 having an adhesive coated thereon comes in contact with the tape retainer 80 but the surface of the same having no adhesive coated thereon comes in contact with the tape guide 40, the tape 6 slidably moves along the tape guide 40 until it is held on the tape rollers 20 while part of the tape 6 is projected ahead of the tape guide 40 by a distance corresponding to an extra length of adhering allowance S of 5 to 10 mm. Consequently, the tape 6 is held on the tape rollers 20 in the waiting state as shown in FIG. 7.

A series of taping operations can successively automatically be performed by repeating the aforementioned steps. Since the tape 6 is firmly retained on the coil 7 for a period of time from the operation shown in FIG. 7 to the operation shown in FIG. 12 by virtue of the elasticity of the material constituting the tape rollers 20 and the normal biasing of the tape 6 toward the coil bobbin 1 caused by the tape guide 40, each taping operation can stably be achieved without any possibility that the tape 6 is incorrectly deformed after it is cut by actuating the tape cutter 60.

After completion of the taping operation, a product of coil is usually detached from the spindle Sp so that the present coil bobbin 1 is exchanged with a new one for performing a subsequent taping operation. However, in case that the foregoing taping operation is achieved for the purpose of interior sheathing in the course of a coil winding operation performed with the coil winding machine, the coil winding operation is restarted on completion of the foregoing taping operation. In this case, since the forward end of the tape 6 is thrusted against the tape rollers 20 by the tape retainer 80 for a period of time until a subsequent taping operation is started while part or the tape 6 is projected by a distance corresponding to the extra length of adhering allowance S of 5 to 10 mm in excess or the position where the tape 6 is retained on the tape rollers 20, there does not arise a malfunction that the foremost end of the tape 6 is dislocated from the predetermined position on the coil bobbin 1. In addition, there does not arise a necessity for forcibly drawing the tape 6 In the forward direction by seizing it at the foremost end thereof with operators' fingers prior to a subsequent taping operation.

While the present invention has been described above with respect to a single preferred embodiment, it should of course be understood that the present invention should not be limited only to tills embodiment but various change or modification may be made without departure from the scope of the present invention as defined by the appended claims.

What is claimed is:

1. A taping method for performing a taping operation, wherein the taping operation is performed by adhering part of a tape corresponding to an extra length of adhering allowance located at a foremost end of the tape to an outer surface of a coil having a coil bobbin and a wire wound about the coil bobbin, the coil bobbin being rotatably supported by a spindle, the method comprising the steps of:

retaining the tape with a tape retaining means against a tape rolling means having at least one tape roller located opposite the coil bobbin while the foremost end of the tape is projected, by a distance corresponding to the extra length of adhering allowance, ahead of a retaining position defined by the tape retaining means;

shortening a distance between the coil bobbin and the tape rolling means until the coil bobbin and the tape rolling means come into contact with one another thereby causing the extra length of adhering allowance to adhere to an outer surface of the coil in cooperation with the tape rolling means;

winding the tape about the coil by rotating the spindle;

displacing a tape cutting means to cut the tape while the tape is retained between the tape retaining means and the coil bobbin and such that a subsequent extra length of adhering allowance of the tape does not enter a region defined by the tape retaining means;

winding any tape remaining on the coil by rotating the spindle;

retractively displacing the coil bobbin in an upward direction;

projecting the tape ahead of the retaining position of the tape retaining means by a distance corresponding to the extra length of adhering allowance before a subsequent taping operation is started;

actuating a tape retainer driving means to rotate a tape retainer of the tape retaining means, the tape retainer being rotatably supported about a support shaft so as to be rotatable in both a clockwise direction to bring the tape retainer in contact with the tape during the step of retaining, and a counterclockwise direction to turnably part the tape retainer away from the tape rolling means during the steps of winding the tape, displacing the tape cutting means, winding any tape remaining on the coil, and retractively displacing the coil bobbin; and actuating a tape guide driving means to displace a tape guide of a tape guiding means in both an upward direction and a downward direction, the tape guide being disposed between the tape rollers and the tape retainer on a base board having a tape unwinder thereon.

2. The taping method according to claim 1, and further including the step of actuating a tape retainer driving means to rotate a tape retainer of the tape retaining means, the tape retainer being rotatably supported about a support shaft so as to be rotatable in both a clockwise direction and a counterclockwise direction outside of a region defined by a tape guiding means, the tape guiding means being effective for guiding the tape.

3. The taping method according to claim 2, wherein the step of actuating the tape retainer driving means comprises the step of rotating the tape retainer in the clockwise direction to bring the tape retainer into contact with the tape during the step of retaining, and in the counterclockwise direction to turnably part the tape retainer away from a tape rolling means during the steps of winding the tape, displacing the tape cutting means, winding any tape remaining on the coil, and retractively displacing the coil bobbin.

4. The taping method according to claim 2, wherein the step of actuating the tape retainer driving means includes the step of actuating a pneumatic actuator disposed on a rear surface of a base board to rotate the tape retainer in the clockwise direction to retain the tape during the step of retaining, and to rotate the tape retainer in the counterclockwise direction to disengage the tape retainer from the tape during the steps of winding the tape, displacing the tape cutting means, winding any tape remaining on the coil, and retractively displacing the coil bobbin.

5. The taping method according to claim 1, wherein the step of displacing the tape cutting means includes the step of actuating a tape cutter driving means to displace a tape cutter of the tape cutting means in both an upward direction and a downward direction, the tape cutter being disposed between the tape rollers and the tape guide.

6. The taping method according to claim 1, wherein the step of actuating a tape guide driving means includes the step of actuating a pneumatic cylinder to displace the tape guide in the upward direction to its highest position during the steps of displacing the tape cutting means, winding any tape remaining on the coil, and retractively displacing the coil bobbin.

7. The taping method according to claim 1, wherein the step of displacing the tape cutting means includes the step of actuating a pneumatic cylinder to displace a tape cutter of the tape cutting means in an upward direction to its highest position.

8. A taping apparatus for performing a series of taping operations, the taping apparatus comprising:

a spindle;

a coil comprising a coil bobbin rotatably supported on the spindle and wire wound about the coil bobbin;

a tape feeding means operatively associated with the coil for feeding tape toward the coil;

a tape rolling means disposed adjacent the coil and movable between a thrusting position in which the tape rolling means comes into contact with an outer surface of the coil for holding the tape against the coil and a parted position in which the tape rolling means does not come into contact with the outer surface of the coil, part of the tape projecting ahead of the tape rolling means when the tape rolling means is in its thrusting position by a distance defining an extra length of adhering allowance of the tape;

an actuator for displacing the tape rolling means between the thrusting position and the parted position;

a tape retaining means disposed adjacent the tape rolling means for fixedly holding the tape in a clamped state in cooperation with the tape rolling means, the tape retaining means being rotatably supported about a support shaft so as to be rotatable in a clockwise direction for retaining the tape and in a counterclockwise direction for disengaging the tape;

a tape guiding means for guiding a feeding of the tape in cooperation with the tape rolling means, the tape guiding means being located between the tape rolling means and the tape retaining means;

a tape guide driving means operatively connected to the tape guiding means for displacing the tape guiding means in both an upward direction and a downward direction;

a tape cutting means located between the tape rolling means and the tape guiding means for cutting the tape at a rearmost end thereof;

a tape cutter driving means operatively connected to the tape cutting means for displacing the tape cutting means in the upward direction while the tape is fixedly held between the tape rolling means and the tape retaining means;

a spindle displacing means for displacing the spindle toward and away from the tape rolling means;

a base board on which the spindle, the tape feeding means, the tape rolling means, the tape retaining means, the tape guiding means, the tape cutting means, and the spindle displacing means are mounted in operative association with a coil winding machine; and control means for producing control signals for controllably driving the tape feeding means, the tape retaining means, the tape guiding means, the tape cutting means and the spindle displacing means.

9. The taping apparatus according to claim 8, and further including tape retainer driving means for rotating the tape retaining means in both the clockwise direction and the counterclockwise direction.

10. The taping apparatus according to claim 8, wherein the tape feeding means includes a tape unwinder mounted on the base board in operative association with the coil winding machine.

11. The taping apparatus according to claim 8, wherein the tape rolling means comprises a pair of tape rollers located opposite the coil bobbin.

12. The taping apparatus according to claim 9, wherein the tape retaining means comprises a tape retainer rotatably disposed outside of a region defined by the tape guiding means, the tape retainer driving means being effective for rotating the tape retainer in both the clockwise direction and the counterclockwise direction.

13. The taping apparatus according to claim 12, wherein the tape retainer is rotated in the clockwise direction to come into contact with the tape to hold the tape, and is rotated in the counterclockwise direction to disengage the tape.

14. The taping apparatus according to claim 8, wherein:

the tape rolling means comprises a pair of tape rollers located opposite the coil bobbin;

the tape retaining means comprises a tape retainer rotatably disposed outside of a region defined by the tape guiding means; and the tape guiding means comprises a tape guide disposed on a front surface of the base board between the tape rollers and the tape retainer, the tape guide driving means being effective for displacing the tape guide in both the upward direction and the downward direction.

15. The taping apparatus according to claim 14, wherein the tape cutting means comprises tape cutter disposed between the tape rollers and the tape guide, the tape cutter driving means being effective for displacing the tape cutter in both the upward direction and the downward direction in cooperation with the tape guide.

16. The taping apparatus according to claim 8, wherein the tape feeding means comprises a tape unwinder disposed on the base board for feeding a tape therefrom.

17. The taping apparatus according to claim 8, wherein the tape guide driving means includes a pneumatic cylinder for displacing the tape guide in the upward direction to its highest position for allowing the tape cutting means to cut the tape at the rearmost end thereof.

18. The taping apparatus according to claim 15, wherein the tape cutter driving means comprises a pneumatic cylinder for displacing the tape cutter in the upward direction in operative association with the tape guide to its highest position for allowing the tape cutting means to cut the tape at the rearmost end thereof.

19. The taping apparatus according to claim 12, wherein the tape retainer driving means comprises a pneumatic cylinder disposed on a rear side of the base board for rotating the tape retainer in both the clockwise direction and the counterclockwise direction.

20. The taping apparatus according to claim 8, wherein the controlling means comprises a microprocessor.

* * * * *